United States Patent [19]

Stoody

[11] Patent Number: 5,476,322
[45] Date of Patent: Dec. 19, 1995

[54] RIGIDLY BRIMMED WIDE MOUTH STRETCH RESISTANT POUCH

[76] Inventor: William R. Stoody, 8659 Summerdale Rd., San Diego, Calif. 92126

[21] Appl. No.: 195,937

[22] Filed: Feb. 14, 1994

[51] Int. Cl.⁶ .................................................. B65D 33/02
[52] U.S. Cl. ............................ 383/33; 248/99; 383/122
[58] Field of Search ........................ 383/33, 122; 248/99

[56] References Cited

U.S. PATENT DOCUMENTS

| | | | |
|---|---|---|---|
| 3,318,759 | 5/1967 | Anderson | 383/116 |
| 3,438,567 | 4/1969 | Bell, Jr. | 383/122 |
| 3,599,538 | 8/1971 | Piazze | 383/122 |
| 4,286,746 | 9/1981 | Gorshe | 383/116 |
| 4,411,300 | 10/1983 | Rico | 383/33 |

FOREIGN PATENT DOCUMENTS 0150027  7/1985  European Pat. Off. ................. 248/99

*Primary Examiner*—Stephen P. Garbe

[57] ABSTRACT

A flexible, thin wall, multi-layer plastic film pouch having an open end and possessing high strength resistance against being manually torn or stretched. A portion of the pouch, extending to the open end, projects upwardly through a substantially rigid annular flange. The end portion, being mechanically stretched outwardly and downwardly over the annular flange, fits tightly over, around and beneath the flange. The pouch is secured to the flange without further means of attachment. Thus, with the pouch being secured to the flange, the end portion provides the pouch with a substantially rigid brimmed annular opening that facilitates storage, aggressive handling and use of existing filling and closure equipment for filling and closure of the pouch.

8 Claims, 3 Drawing Sheets

RIGIDLY BRIMMED WIDE MOUTH STRETCH RESISTANT POUCH

RELATED INVENTIONS

Applicant's U.S. Pat. No. 5,004,123 dated Apr. 2, 1991, U.S. Pat. No. 5,005,733, dated Apr. 9, 1991 and U.S. Pat No. 5,012,956, dated May 7, 1991 are relevant to the present invention, in that, they either demonstrate a plastic pouch having one end drawn over the open end of a bottle or they show attachment of a ring to the open end of the pouch.

BACKGROUND OF THE INVENTION

The present invention relates to a durable, multi-layer polymeric, stretch resistant flexible pouch (bag) having heat sealingly laminated side margines and a rigidly brimmed wide mouth open end. This pouch is particularly useful for sealed containment and storage of liquids, solids, granulates and powders such as those commonly stored in other types of containers, e.g., jars, bottles, and cans. Use of this rigid mouth pouch will contribute greatly to source reduction of plastic waste in that this pouch can serve as a prefilled refill that can be conveniently inserted into reusable dispensing bottles, and by repeatedly replacing emptied prefilled refills a dispensing bottle can be reused numerous times. Also, this pouch can serve as a basic stand up container having substantially less disposable plastic than bottles.

More particularly the present invention relates to a high strength plastic pouch having an open end portion that is forcefully stretched onto an annular rim, wherein the open end portion tightly engages the rim, so as to provide the pouch with a rigid brim that facilitates filling and sealing closure of the pouch using equipment and methods that are commonly used for filling and sealing closure of bottles. Filled or empty the brimmed pouch is capable of withstanding aggressive handling, shipping and storage, and during filling and closure operations the brim facilitates temporary support of the pouch in a carrier. In addition, the brimmed end of the pouch facilitates standing of filled and closed pouches on store shelves. The brimmed end also facilitates use of the pouch in squeeze bottle, pump dispenser and other dispensing bottle applications.

In applicant's above mentioned related inventions the inside surface at the open end of a flaccid bag is merely shown to be bonded to the outer vertical wall surface of a fitment ring, or vice versa. Either way, attachment of the bag to the fitment ring is difficult to achieve. A practicable process for such attachment has not yet been devised. In addition, attachment to the vertical wall produces an undesirable product entrapment region, that causes an undesireable amount of product to remain in the bag, because the bag is not free to displace product in the entrapment region.

The present invention distinguishes over applicant's mentioned related inventions, in that, it defines a novel stretch resistant pouch being secured to a substantially rigid annular rim, by an open end of the pouch being mechanically expanded and tightly contracted over, around and beneath the rim. The product entrapment region discussed above, in reference to applicant's related inventions, is eliminated in the present invention. Thus, the present invention defines an improved pouch having a substantially smooth and unwrinkled rigid brimmed fill opening.

The need for a plastic bag being attached to a ring, so as to produce a high strength plastic pouch having a rigid open mouth, has existed for many years. Many ideas have been explored in attempts to provide an economical method of producing such pouch have been tried without too much success. This is evidenced by applicant's above mentioned related inventions as well as U.S. Pat. No. 3,420,413 issued to D. F. Corsette on Jan. 7, 1969 and U.S. Pat. No. 4,147,278 issued to Albert Uhlig on Apr. 3, 1979.

The Corsette patent typifies one approach by providing a costly pouch having a molded in place neck so as to overcome problems associated with supporting the pouch within an outer container and sealing.

Using a different approach, the Uhlig patent provides an inexpensive flaccid bag that is simply cuffed back over the neck of a bottle. Uhlig defines an easily stretchable flexible plastic film bag, which is separated along perforations from a roll of such bags. It is essentially a disposable baby bottle bag. The Uhlig concept requires the bag to be in place during filling, and Uhlig does not account for excessive leak path wrinkles that are produced at the sealing surface. Also, the bag must be attached to a bottle, it cannot be used alone, it lacks strength and durability. Experence has shown that the Uhlig bag is prone to the development of leaks at its corners.

It is also pointed out that well known easily stretchable polyethylene pouches, such as those having an open end that is folded over the opening of a baby bottle, have a pair of tear-off flaps which are provided for pulling the open end of the pouch over the mouth of the bottle. Also, to facilitate pulling the pouch, without tearing the flaps off, the pouch must be sized such that the outer surface circumference of the pouch is approximately equal to the outer surface circumference of the bottle opening. Thus, when the pouch end is folded over it is not tightly contracted into place and the portion of the pouch that overlies the bottle opening is prone to slipping loose. As a result the flaps are also necessary aids that prevent the pouch from slipping off of the bottle while the pouch is being filled. This method of holding a pouch in a baby bottle is only suitable for momentary support of a filled pouch while a retainment cap is tightened into place.

The baby bottle pouch tear-off flaps are useless for a reinforced stretch resistant pouch because they tear away under the force required to stretch the pouch over a flange. Even if the flaps are not made to tear off, stretch resistant bags having pull flaps have been tested and found to be unfit for stretching onto an annular rim because they do not distribute the pull force uniformly. As a result the pouch is overly stressed and unusably deformed.

The only method found to be suitable, for stretching the open end of a pouch onto a rim, is by use of an expanding apparatus, as will be described hereinafter in substantial detail, having collet sectors that facilitate controlled uniform stretching and release of the pouch.

SUMMARY OF THE INVENTION

The present invention provides for the first time a rigid wide mouth flexible plastic pouch that is durable and economical. It can be prefilled and closed and it can be utilized as a stand alone container, it can be utilized as a replaceable prefilled collapsible bag cartridge in squeeze bottle and pump applications, and it can be utilized as a sterile bottle liner.

A primary objective of the present invention is to provide a durable high strength plastic pouch, for air tight containment of liquids and dry goods, with a substantially rigid open mouth that facilitates filling and closure of the pouch.

Another objective of the present invention is that the brimmed wide mouth facilitates filling and closure of said pouch by conventional bottle filling methods.

Another objective of the present invention is to provide a mechanically disposed open end portion of a tough, stretch resistant flexible pouch being secured onto an annular rim.

Another objective of the present invention is to provide a reinforced plastic pouch, for containment of a dispensable liquid, with a brim that facilitates supporting of the pouch within a reusable dispenser.

Still another objective of the present invention is to provide a flexible pouch having a gussetted bottom, which facilates standing of the pouch in an upright position, with a brimmed rigid mouth that extends from straight side walls of the pouch.

These and other objectives will be seen from the following specification and claims in conjunction with the appended drawings. Specific terminology resorted to in describing the methods and embodiments of the present invention is not intended to be limiting. It is understood that this is for clarity and includes all technical equivalents which function in a similar manner to accomplish a similar purpose or result.

THE DRAWING

DETAILED DESCRIPTION OF THE INVENTION

Figure 1:
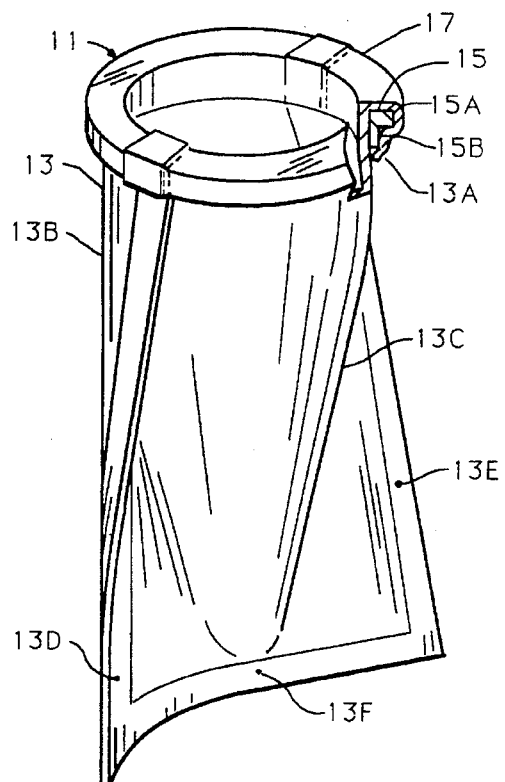
FIG. 1 is an isometric view of the rigidly brimmed wide mouth pouch of the present invention, having a brim portion broken away, revealing an annular rim onto which a portion of the pouch is contracted.

Now, referring to drawing, FIG. 1, a preferred rigid mouth pouch embodiment is generally indicated at 11 and includes a flexible stretch resistant plastic pouch (bag) 13 having an open end portion 13A which is stretched tightly and embracingly onto a rim 15, whereby said pouch is securely attached to said rim and is thereby provided a rigid brimmed fill opening 17.

Rim 15 is a substantially rigid, ring-like sleeve having, at one end, a peripherally extending flange 15A and a depending sleeve portion 15B. Said rim may be constructed from any suitable metal, glass or plastic material, and it may be circular or oval in form. Inside and outside dimensions of rim 15 are such that said rim corresponds to a predetermined pouch size and shape.

Pouch 13 can be constructed in a conventional manner by heat sealingly joining two rectangular sheets of plastic stock together to form a flat envelope that is open at one end. For example two laminated sheets of polymeric (plastic) material, which constitute opposite sidewalls 13B and 13C, can be placed face to face and heat sealingly joined together at one end and along their overlying longitudinal edges so as to provide an open end, a continuous pair of side margins 13D and 13E, and a bottom margin 13F. Desirably, the heat sealingly joined margins are fully bonded and approximately ⅜ inch wide. In an open state, prior to being expanded and embracingly contracted on to rim 15, the circumferential dimension of said pouch open end portion 13A is preferably equal to the inside circumferential dimension of said rim. And, therefore the circumferential dimension of said pouch open end portion is substantially less than the outer circumferential dimension of said rim flange.

Pouch 11 is required to possess several different characteristics, it must be flexible, it must be highly resistant to stretching, and it must have high strength, toughness and durability to withstand shipping and handling prior to and during containment of product. In addition the characteristics of the pouch must ensure that during use it will provide adequate protection of its contents from loss of flavor or aroma. To enable said pouch to possess several different characteristics the pouch structure is a lamination of several material film layers. Laminated material less than 0.002 of an inch thick and greater than 0.020 of an inches thick have been sucessfully utilized in the construction of pouch 11. At least one film layer of polyethylene, polypropylene or blends thereof is use to provide a barrier against loss of liquid contents from said pouch and to facilitate heat sealing said plastic sheets together. In addition a film layer of saran or similar material may be provided to provide a barrier against loss of contents aroma from the pouch. And to provide said pouch with additional strength and toughness a film layer of nylon or polyester is employed, Layers of other material such as aluminum may be desirable for containment of some products. The particular materials selected will be dependent upon the anticipated strength needs of pouch 11 as well as the particular character and needs of the product to be contained therein.

The highly stretch resistant characteristic of the pouch is necessary to ensure that a filled and sealed pouch will not stretch and or rupture under reasonable handling and shipping conditions. What is meant in describing the pouch as being highly stretch resistant is that the pouch material is such that, at ambient temperature of approximately 73.4° F., it cannot be readily stretched onto said rim by hand (unaided) without substantial deformation and loss of its contracting ability.

Figure 2:
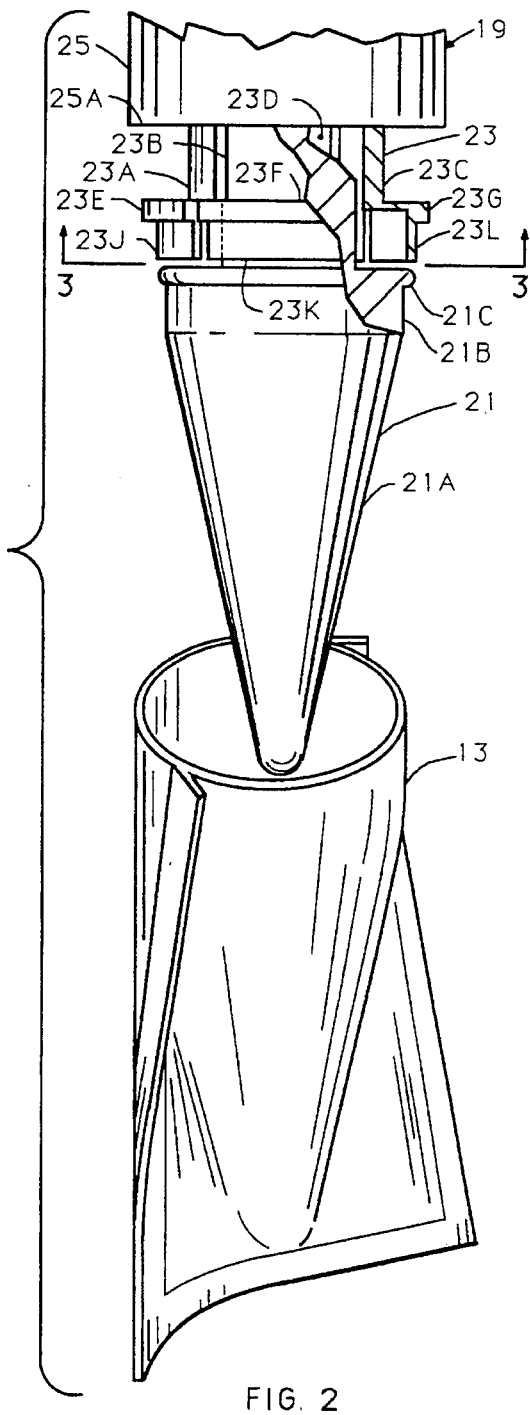
FIG. 2 is an exploded view illustrating positioning of a bag, onto an expander apparatus, in a construction stage of said pouch.

For uniform, controlled and limited stretching of pouch 13 onto rim 15 a mechanical apparatus such as pouch expander 19, as seen in FIG. 2, is utilized. Pouch expander 19 is a novel apparatus which applicant has invented and developed specifically for the purpose of placement of a stretch resistant pouch onto a rim. Therefore, it must be appreciated that since pouch expander 19 is not the subject of the present invention it will not be described in any greater detail than necessary to demonstrate the viability of the present invention.

Figure 3:
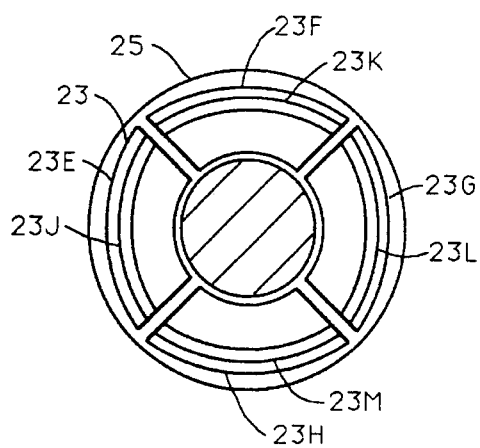
FIG. 3 is a sectional view, taken in the direction of line 3—3 of FIG. 2, which illustrates the arrangement of collet sectors components of the expander apparatus.

Pouch 13 as seen in FIG. 2 is positioned for placement onto pouch expander 19 which has a longitudinal axis and comprises a mandrel 21, a collet set 23 (preferably four) of collet sectors 23A, 23B, 23C and 23D which are all seen in FIG. 3, and a unification structure 25 having a distal end 25A. Said mandrel and said collet sectors individually depend from unification structure 25. In addition, said unification structure and said collet sectors are axially moveable with respect to said mandrel and each collet sector is laterally moveable with respect to said unification structure.

Figure 5:
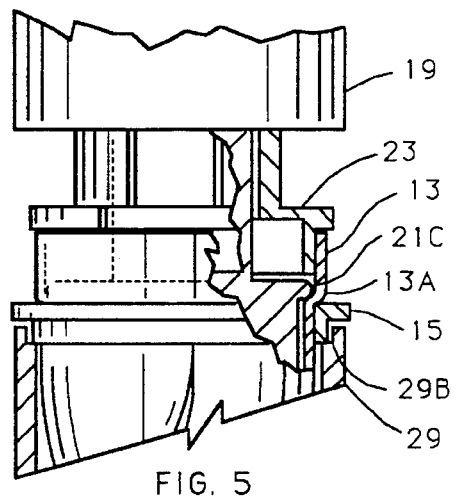
FIGS. 5, 6 and 7 are similar fragmentary views which sequentially illustrate transitional stages of the bag and expander apparatus, with respect to the rim, during construction.
Figure 6:
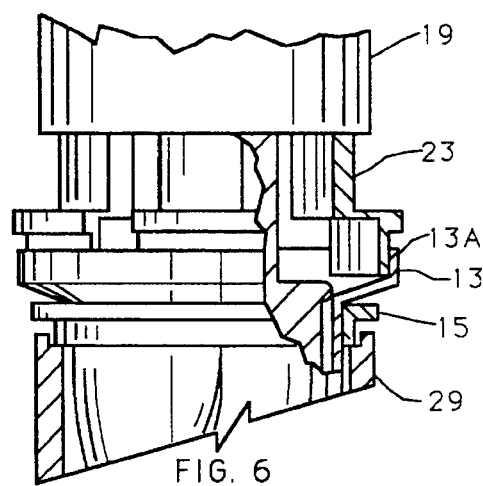
Figure 7:
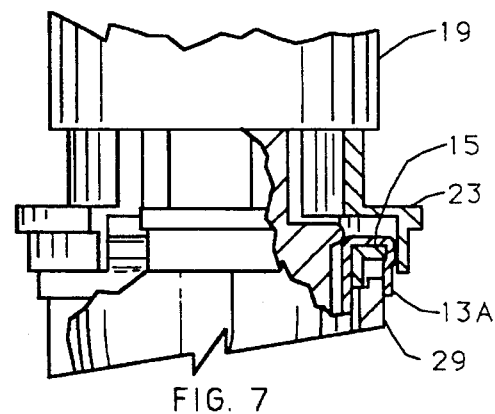

Mandrel 21 has a tapered end 21A which facilitates loading of said pouch onto said expander, a straight portion 21B which is sized to fit freely inside of said pouch, and a circumferential protuberance 21C which is sized to provide a snug fit with the inside uppermost end portion of said bag. It is also pointed out that circumferential size of protuberance 21C is sufficiently greater than the inside circumferential size of rim 15, whereas the circumferential size of said straight portion is smaller. The shape of mandrel 21 is such that with the pouch positioned thereon said rim will readily fit over said tapered and straight portions of said mandrel and be abuttingly seated against the pouch at said circumferential protuberance. Whereas, the pouch is held securely between rim 15 and mandrel protuberance 21C as seen in FIGS. 5–7.

Said moveable collet sectors, as seen in FIG. 3, are normally arranged in a substantially closed circular relationship whereas a slight gap may exist between adjacent collet sectors. Said collet sectors are alike, each having an arcuated wedge shape end consisting of a radially extending flange, respectively designated 23E, 23F, 23G and 23H, and a thin downwardly extending arcuated skirt portion correspondingly designated 23J, 23K, 23L and 23M.

Construction of expander 19 is such that in operation unification structure 25 travels axially with respect to mandrel 21 and said axial travel produces concurrent movement stages of said collet sectors in two sequential directions. That is, in operation mandrel 21 is stationarily restrained and operational action of said expander causes unification structure 25 to travel a predetermined distance toward mandrel 21 and forces derived from a portion of this travel cause said collet sectors to move laterally in outwardly radial directions, that are prependicular to said axis, for a predetermined distance whereat said collet sectors are in a fully extended circular relationship with each other. At that point said lateral movement ceases and said collet sectors then travel axially in unison with said unification structure toward said mandrel for the remaining predetermined travel distance of said unification structure. Thus axial travel of said unification structure toward said mandrel results in two operational travel stages of said collet sectors, the first stage causing said collet sectors to move horizontally in outward radial directions and the second stage being said axial travel of said collet sectors in unison with said unification structure. Also, following operational action of said expander said unification structure and said collet sectors move in a reverse manner.

Figure 4:
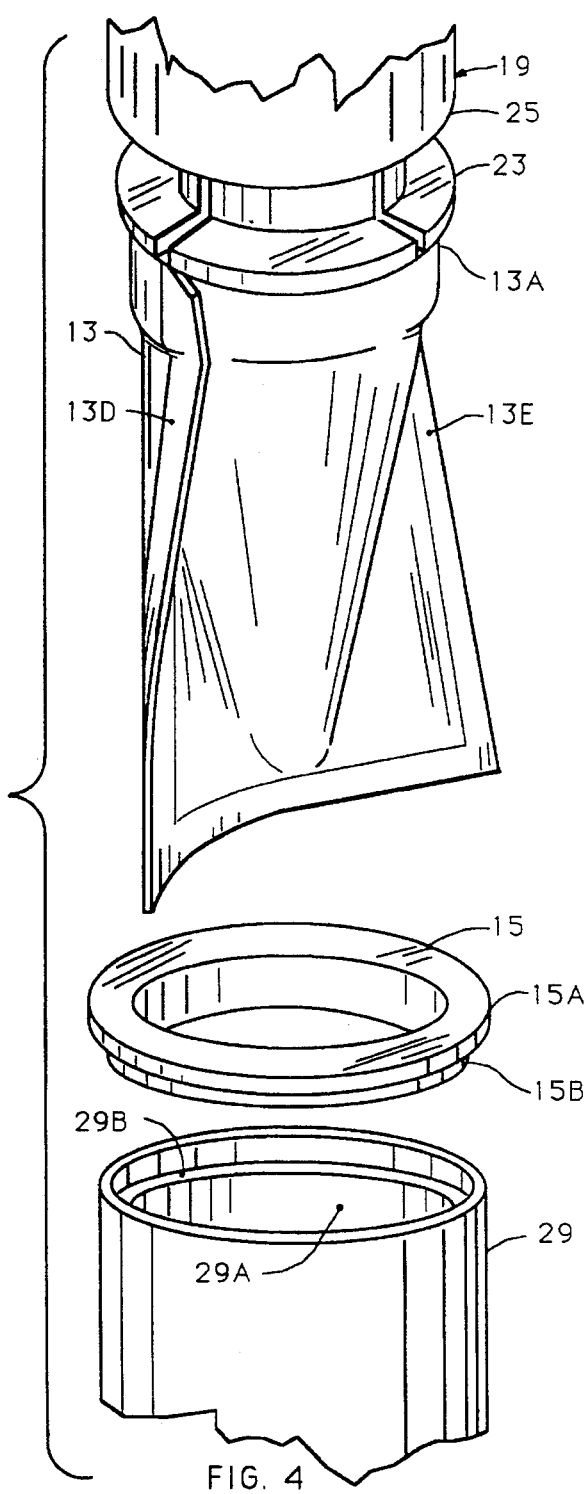
FIG. 4 is an exploded isometric view illustrating the possitional arrangement of the bag and rim, with respect to the expander apparatus and a support cylinder, in a construction stage.

In FIGS. 4–7 the operation of joining rim 15 and stretch resistant pouch 13, so as to provide said rigid mouth pouch, is sequentially illustrated. First, as seen in FIG. 4, pouch 13 is positioned on pouch expander 19, whereas said mandrel and said thin wall skirts (not visible in FIG. 4) are inside of said pouch and open end 13A abuts the flange portion of said collet sectors. Prior to positioning said pouch onto said pouch expander care is taken to make sure that side margins 13D and 13E are turned in the same direction, desireably both margins are turned toward one side wall of said pouch, when pouch 13 is positioned onto said pouch expander.

Also rim 15, seen in FIG. 4, may be slipped up into position over said pouch or said pouch may be lowered into said rim. In either case a reusable cylindrical support fixture 29 is provided to hold rim 15 in position for the operation of attaching said rim to said pouch as seen in FIGS. 5–7. For this purpose fixture 29 is provided with a bore 29A that is sized to accommodate mandrel 21 with the pouch in place. The uppermost end diameter of said bore is enlarged providing an annular ledge 29B upon which the distal end of rim sleeve portion 15B seats.

FIG. 5 shows said open end portion 13A and said rim 15 being constrained tightly against each other, between said mandrel protuberance 21C and ledge 29B, whereas said mandrel is stationarily constrained with said collet sectors positioned in readiness for said first stage horizontal movement. Resulting from said first stage movement, as shown in FIG. 6, open end portion 13A of said pouch is uniformly expanded over said rim and it has slipped down on said collet sectors, and said collet sector skirts are above and outboard of said rim flange in readiness for said second stage axial movement of said collet sectors. And, as seen FIG. 7, said second stage movement results in said pouch open end portion being slidingly released from said collet sectors and turned downwardly so as to overlie and encircle said rim. Said pouch open end portion slides from said collet sectors during the second stage movement so that at the end of said second stage movement said pouch open end portion releases itself from said collet sectors and contracts about said rim flange. Thus, said open end portion is self releasing from said collet in a prescribed manner. Immediately thereafter elastic memory of said pouch material causes said pouch opened portion to contract tightly and embracingly over, around and beneath said rim flange, as shown in FIG. 1, and said pouch expander is withdrawn from said pouch.

MODIFICATIONS

Figure 8:
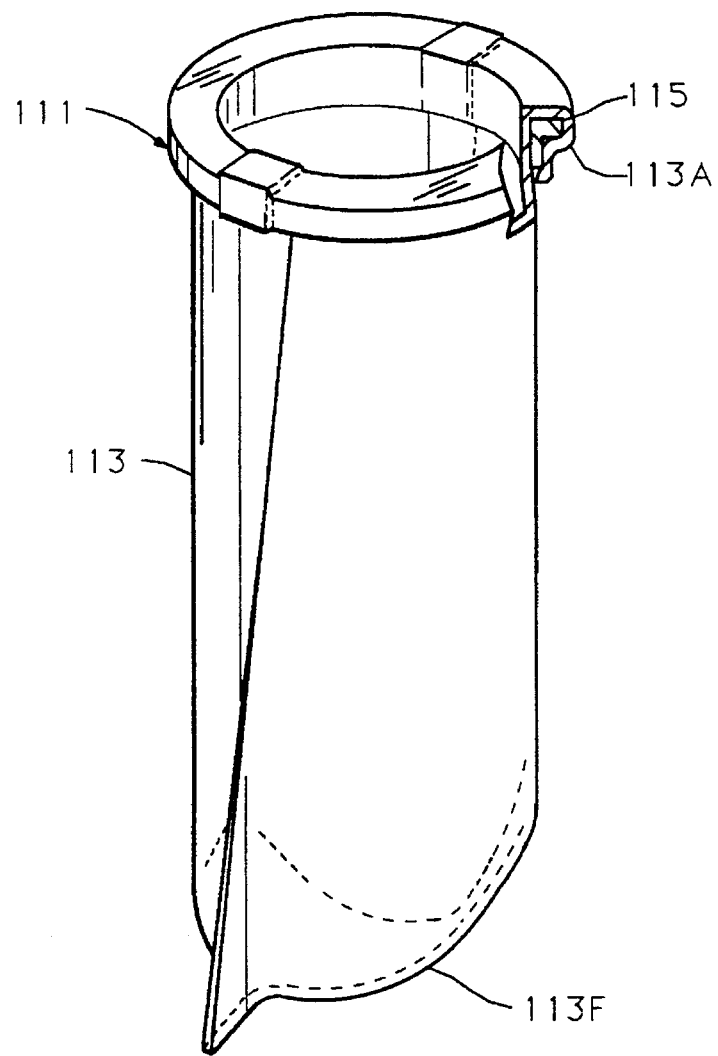
FIG. 8 is an isometric view, similar to FIG. 1, illustrating another embodiment of the present invention, where as the bag is a conventional gussetted bottom stand-up pouch.

Shown in FIG. 8 is a modified rigid mouth pouch 111 which is similar to rigid mouth pouch 11. The only diference being that rigid mouth pouch 111 includes a common stand up plastic pouch 113 having a folding gussetted bottom 113F instead of bottom margin 13F.

Like pouch 13, pouch 113 has an upper open end portion 113A which is embracingly secured to a rim 115, which is like rim 15, in the heretofore described manner.

Figure 9:
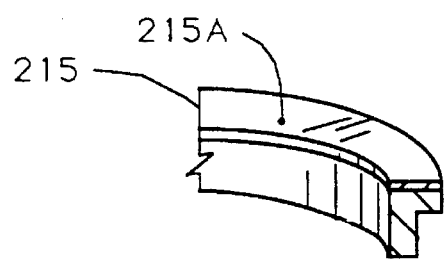
FIG. 9 is a fragmentary sectional view, of a modified rim embodiment, which illustrates the rim having a metallic surface.

A second modification relating only to the rim structure is shown in FIG. 9. In this modification a non-metallic rim now designated 215, which is of the same configuration of rim 15, is provided with a metal uppermost surface 215A. The metal surface may be aluminum or other metal having good thermal conductivity, and it may be laminated, bonded, plated, molded in place or affixed by any other suitable method onto the uppermost surface of said rim. The purpose of rim 215, which may be utilized in place of rim 15, is to facilitate induction sealing of a lid (not shown) onto a rigid mouth pouch.

It is thought that the invention and its advantages will be understood from the foregoing description, and it is apparent that various changes may be made in the form, construction and arrangement of parts without departing from the spirit and scope of the invention or sacrificing its material advantages, the forms heretofore described and illustrated in the drawings being merely embodiments thereof.

Having described my invention, reference should now be directed to the following claims.

I claim:

1. A rigidly brimmed wide mouth flexible pouch for containment of liquid, solids, granulates, and powders, which comprises:

a flexible and highly stretch resistant plastic bag having an open end portion and sidewall portions:

a rim, being an annular sleeve having a peripherally extending flange, being outside of said bag;

said open end portion being turned inside of out and tightly and embracingly contracted onto said rim flange;

said sidewall portion being in unturned pristine disposition;

wherein, said rim is securingly fastened to said bag and thereby establishes a rigidly brimmed wide mouth opening into said pouch.

2. In the invention of claim 1, said bag being a gusseted bottom stand-up pouch.

3. In the invention of claim 1, said bag being uniformly expanded by a mechanical means;

wherein said mechanical means provides controlled limited expansion of said open end portion above said rim and thereafter positionally disposes said open end portion over and around said rim flange.

4. In the invention of claim 1, said rim having an uppermost metallic surface.

5. A rigidly brimmed wide mouth flexible pouch for containment of liquid, solids, granulates, and powders, which comprises:

a flexible and highly stretch resistant bag having an open end portion and sidewall portions;

a rim, being an annular sleeve having a peripherally extending flange, being outside of said bag;

said bag being polymeric material sealingly joined along side and bottom edges so as to be in the form of a flat envelope;

said open end portion being turned inside of out and contracted embracingly and securingly onto said rim flange;

said sidewall portions being in unturned pristine disposition;

wherein said bag open end portion and said rim establish said rigid brimmed wide mouth opening into said pouch.

6. In the invention of claim 5, said bag being a gusseted bottom pouch.

7. In the invention of claim 5, said rim having an uppermost metallic surface.

8. In the invention of claim 5, said wide mouth brimmed opening being oval.

* * * * *